(12) United States Patent
Uphoff et al.

(10) Patent No.: US 7,331,778 B2
(45) Date of Patent: Feb. 19, 2008

(54) PROCESS AND ARRANGEMENT FOR THE PRODUCTION OF BLOW-MOLDED HOLLOW BODIES

(75) Inventors: Heinrich Josef Schulze Uphoff, Bonn (DE); Jan Peter Jacobs, Lohmar (DE)

(73) Assignee: Mauser-Werke GmbH, Bruehl (DE)

( * ) Notice: Subject to any disclaimer, the term of this patent is extended or adjusted under 35 U.S.C. 154(b) by 196 days.

(21) Appl. No.: 10/483,544

(22) PCT Filed: Jun. 7, 2002

(86) PCT No.: PCT/EP02/05678

§ 371 (c)(1),
(2), (4) Date: Mar. 24, 2004

(87) PCT Pub. No.: WO03/008177

PCT Pub. Date: Jan. 30, 2003

(65) Prior Publication Data

US 2004/0156942 A1  Aug. 12, 2004

(30) Foreign Application Priority Data

Jul. 10, 2001 (DE) .......................... 201 11 443 U

(51) Int. Cl.
*B29C 49/58* (2006.01)
*B29C 49/66* (2006.01)
(52) U.S. Cl. ..................................... 425/526; 425/535
(58) Field of Classification Search ............... 425/526, 425/528, 535; 264/28, 528
See application file for complete search history.

(56) References Cited

U.S. PATENT DOCUMENTS 3,065,501 A  11/1962  Gasmire

| | | |
|---|---|---|
| 3,505,442 A | 4/1970 | Culpepper |
| 3,869,236 A * | 3/1975 | Schonewald ................ 425/144 |
| RE28,497 E * | 7/1975 | Gasmire ........................ 264/28 |
| 4,091,059 A * | 5/1978 | Ryder ............................ 264/28 |
| 4,367,187 A | 1/1983 | Fukushima et al. |

(Continued)

FOREIGN PATENT DOCUMENTS

DE  1 272 525  7/1968

(Continued)

OTHER PUBLICATIONS

Rosato et al, Blow Molding Handbook, Hanser Publishers, 1989, p. 303.*

*Primary Examiner*—Robert B. Davis
(74) *Attorney, Agent, or Firm*—Henry M. Feiereisen; Ursula B. Day

(57) ABSTRACT

The present invention refers to an arrangement for the production of blow-molded hollow bodies from plastic with a blow molding machine, wherein a cooling medium can be blown via a conduit into a blow mold respectively into the hollow body for blowing up and cooling of the blow-molded hollow body. For improvement of cooling the interior of the hollow body within the blow mold, a closed conduit system is provided, in which the cooling medium circulates and is kept at an elevated pressure level and is cooled by means of a heat exchanger. Thereby, a higher yield of piece per time is realized at lower production cost. The closed cooling medium circulation system can be essentially retrofitted to all blow molding machine in order to raise efficiency.

12 Claims, 2 Drawing Sheets

U.S. PATENT DOCUMENTS 4,394,333 A 7/1983 Fukushima et al.
4,488,863 A * 12/1984 Collette .................. 425/530
5,076,778 A * 12/1991 Strunk et al. ............ 425/387.1
5,229,043 A * 7/1993 Lee ........................ 264/37.16

FOREIGN PATENT DOCUMENTS

| EP | 0 560 522 A | | 9/1993 |
|---|---|---|---|
| EP | 0 754 537 A | | 1/1997 |
| JP | 04294121 A | * | 10/1992 |
| JP | 06055621 A | * | 3/1994 |
| WO | WO 96/25285 A | | 8/1996 |

* cited by examiner

PROCESS AND ARRANGEMENT FOR THE PRODUCTION OF BLOW-MOLDED HOLLOW BODIES

BACKGROUND OF THE INVENTION

The present invention refers to a process and an arrangement for producing blow-molded hollow bodies from plastic by means of a blow-molding machine, wherein preferably a gaseous cooling medium can be blown into the blow mold or into the hollow body for blowing the hollow body and cooling the blow-molded body via a conduit. After blowing the hose shaped pre-form made of moldable plastic material into the actual hollow body, the final blow-molded hollow body or the plastic product must subsequently remain in the mold and cooled until it has reached a sufficient inherent stability and can then be taken from the mold. The time in which the hollow body is cooled is defined as the cooling period.

The cooling procedure of the plastic hollow body in the blow mold is generally the slowest and is thus the time-determinative step in the productivity of a blow molding machine. When reducing the cooling period, the efficiency or the number of discharged pieces of the article produced per time unit can be raised considerably. Cooling of the hollow body within the blow mold is carried out on the one hand from the outside through a direct contact of the plastic material with the interior wall of the cooled blow form and on the other hand, from the inside via the cooling medium which is blown in. According to the prior art, cooling is understood to mean all methods where heat is withdrawn from the inner wall of the blow molding piece. Thereby, a heat transfer takes place from the inner side of the surface of the hollow body to the cooling media that are within the hollow body and a subsequent heat transport away therefrom. The energy which is taken up through the media is taken from the hollow body and together with the media is dissipated to the outer environment.

DISCUSSION OF THE PRIOR ART

The methods known in the prior art for inside cooling of the blow-molded plastic hollow bodies vary in the way and the condition of the medium or media used and a phase transition which eventually takes place and the type of exchange between the interior of the hollow body and the environment. Normally air that has been compressed (compressed air) is utilized as a medium. In the so-called dynamic air process, the hollow body is blown up by means of compressed air which is blown into the pre-form. The blow pressure is normally between 5 to 8 bar. The compressed air trapped within the hollow body remains there at first, takes up heat from the hollow body interior and during venting, is being transferred to the environment. Thereby a certain amount of heat is withdrawn from the hollow body. The so-called interval blow molding process works in a similar way. In this process, the enclosed and heated air is allowed to escape in intervals, which then is replaced through compressed air with lower temperature. In the back flush or blow air process, the exchange of warm air through cold air is carried out in a continuous process in the form of a back flush procedure. It is possible to intensify the known method by cooling the blow air utilized previously, for example normal compressed air temperature of 25 C to 0 C or, after preceded drying of the blow air (for example by means of an adsorption dryer) or to cool further to below 0 C, for example, to −30 C. Thereby, a greater temperature difference is realized between the compressed air and the interior surface of the hollow body. In addition, the blow pressure can be raised from a level which is significantly above the normal level and can be considered as a separate variation of the interior cooling. Further cooling methods that are known in accordance with the prior art, are interior cooling with deeply cooled liquefied gases. Thus, for example after blowing up the pre-from with the compressed air, deeply cooled liquefied carbon dioxide or nitrogen is blown into the hollow body as an additional medium. The liquid components that evaporate warm up under uptake of considerable amounts of heat. A further possibility to realize interior cooling is by injecting water or other media after blowing up the pre-form. Addition of these media can be realized in a continuous way or also intermittently. Some of the afore-described methods can be also carried out as combined methods.

SUMMARY OF THE INVENTION

It is therefore object of the present invention to improve the interior cooling of blow-molded plastic hollow bodies, while at the same time, lowering overall the manufacturing cost of the manufactured plastic articles.

This object is solved by the arrangement of the invention having features as recited in herein: an arrangement for producing blow formed hollow bodies from plastic, with a blow molding machine, wherein a cooling medium can be blown into a blow mold respectively into the hollow body for blowing up and cooling of the blow-molded hollow body via a conduit, characterized in that the blow mold respectively the hollow body is integrated into a closed conduit system for guiding the cooling medium in circulation. The following dependent claims recite further advantageous embodiments of the blow mold arrangement according to the present invention. The object of the invention is also solved in accordance with the features of the process as becomes clear from the process claims. The dependent claims that are following recite additional advantageous embodiments thereof.

The arrangement according to the present invention serves as realization of an interior cooling of the most novel type. The cooling effect realized in the blow mold or in the hollow body which is blown up therein follows according to the combination of about three known methods, namely that of the blow air method under utilization of cooled compressed air or compressed air which has been cooled further or deeply cooled compressed air under elevation of the blowing pressure. The blow air or the blow medium can thereby be enriched with a further gaseous medium (e.g. nitrogen).

The function of the arrangement according to the present invention is summarized in the following way.

1. The cooling medium is lead into a closed conduit system where it circulates and is filtered by means of one or more filters and cooled by means of integrated heat exchangers or cooled even lower by means of an additional cooling aggregate.
2. The circulating cooling medium in the closed conduit system, depending upon the size of the hollow body, is at elevated pressure levels up to about 20 bar.
3. The cooling medium is blown into the hollow body to realize an improved cooling effect by means of a swirl body under a fluidizing rotational flow to thus improve the heat exchange and in order to improve the cooling effect.
4. The heat capacity of the cooling medium is raised through increase of the blow air or the partial or complete exchange of other gaseous or fluid media (e.g. carbon dioxide, nitrogen, propane, water, noble gases or other gases which exhibit a heat capacity that is higher than that of air).

DESCRIPTION OF PREFERRED EMBODIMENTS

Description of the Arrangement

Figure 1:
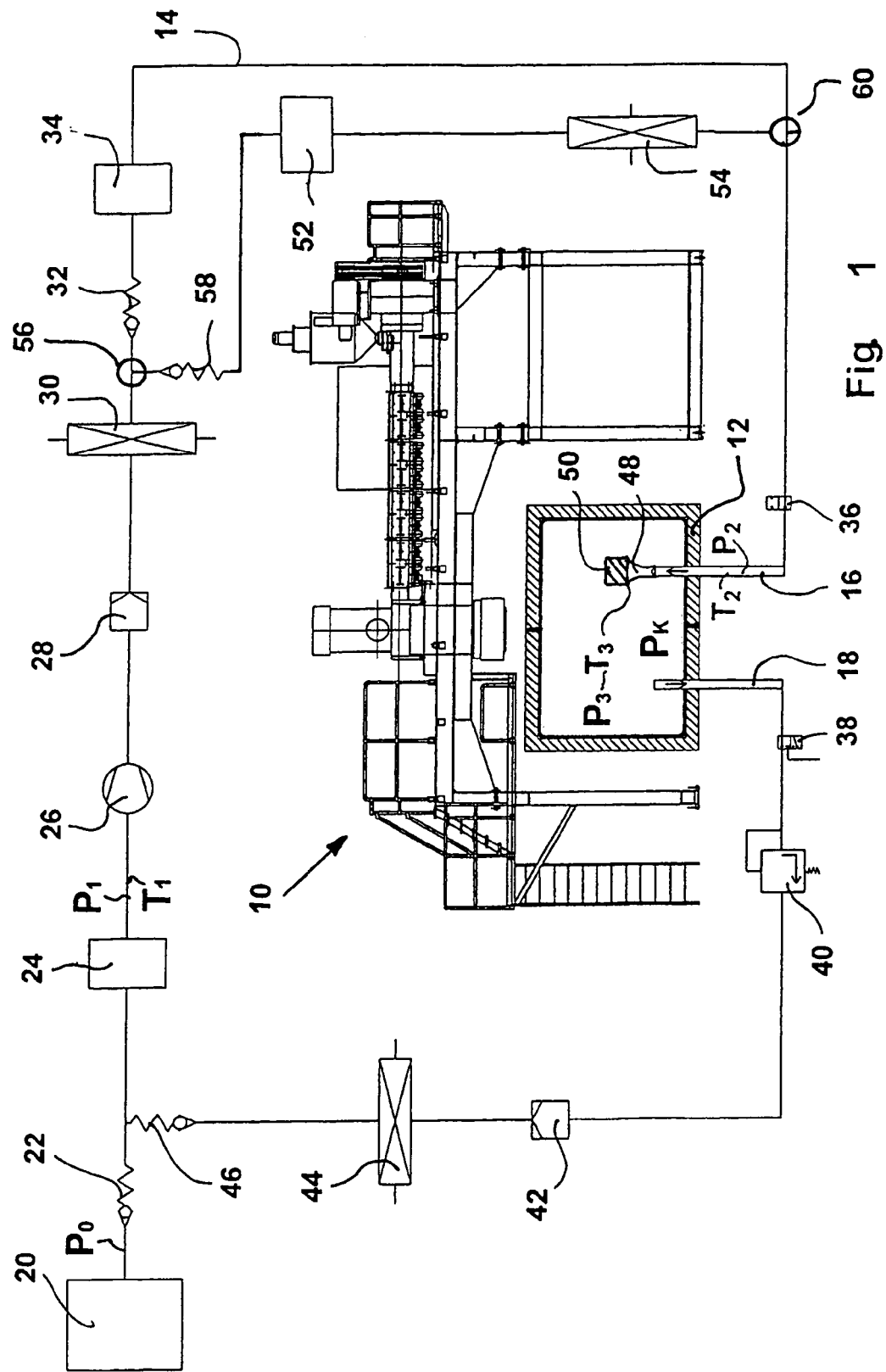
FIG. 1 is the schematic representation of the arrangement according to the present invention.

The present invention is more closely described and illustrated in FIG. 1 as follows by means of a schematic illustration of an embodiment. The arrangement comprises the blow mold machine 10 with blow mold 12, in which the plastic hollow body is blown up. The blow mold 12 is integrated into a closed conduit system 14 for the blow—and cooling medium or the blow air.

Normally, the blow and cooling medium is regular air, which as follows is designated blow-or cooling air. Of course, the blow air can be enriched or replaced by other gaseous or fluid media (e.g. carbon dioxide nitrogen, propane, noble gases or other gases with elevated heat capacity) It is also possible to gasify or vaporize fluids such e.g. water and or solid media particles (e.g. carbon dioxide ice) for additional injection into the hollow body. The injection of the blow air into the hollow body is carried out at the inlet via a blow mandrel 16 and at the outlet, likewise via a corresponding blow mandrel respectively an expanding mandrel 18. When dealing with particular hollow bodies, such as for example a canister, which is equipped with only one inlet and/or outlet opening, the single blow mandrel is normally provided with an inlet line and a corresponding outlet line for the compressed air. The inlet line and the outlet line can be arranged adjacent to each other in concentric manner in one blow mandrel.

The conduit system 14 comprises at the inlet side further components such as a connector 20 to a cooling medium reservoir, a check valve 22 a storage container 24, a compressor 26, a filter 28, a heat exchanger 30 or a cooling aggregate, a further check valve 32, a second storage container 34 and as proximate as possible directly in front of the blow mandrel 16, a cut-off valve 36. At the outlet side likewise as close as possible directly in front of the blow mandrel 18, a further cut-off valve 38 with ventilation outlet. A pressure control valve 40, a second filter 42, a second cooler 44 (=heat exchange) and a further check valve 46 follow thereafter. The conduit system 14 closes the cycle by following downstream of the check valve 46 and the first check valve 22. When utilizing a cooling medium whose temperature is below the freezing point for water, then all components utilized in connection therewith can be affected thereby and thus must have a suitable lay-out so that freezing of one of the various components is prevented.

Description of the Process

The cooling medium (e.g. blow air) is taken from the storage 24 at a temperature $T_1$ under pressure $P_1$. The storage container 24 is kept under a minimum pressure of $P_0$ (e.g. 5 bar) via a check valve. The medium taken from the storage 24 is compressed by means of a compressor 26 to a higher pressure (for example 20 bar) and after filtering in filter unit 28 and cooling to a lower temperature in cooler 30, is guided into a further storage container 34. From the storage container 34, the pre-form which is situated within the blow mold 12 of blow molding machine 10 is blown up through the medium into the complete hollow body and form-finished. Subsequently, the hollow body, after a possible stop phase is continually flushed by the cooling medium from the storage container 34. The blowing up and flushing or cooling is carried out via the first blow mandrel 16 which is brought into the inlet opening of the hollow body. Through this blow mandrel 16, the cooling medium flows via a nozzle 48 into the hollow body. At the nozzle 48, a flow efficient flow screen or a swirl guide plate 50 is provided. This swirl guide plate 50 confers some speed in circumferential direction (rotational flow) to the flow of the cooling medium which up to this point was flowing in axial direction. In this manner, the medium flows into the hollow body for cooling purposes. Subsequently, the cooling medium flows through the outlet line or the outlet blow mandrel 18 and the pressure control valve 40 from the hollow body. After the medium has exited the hollow body it is however not released into the environment as is generally done, but after filtering in filtering unit 42 and cooling in the cooler 44 to a temperature $T_1$ (for example 15 C) is guided through a further check valve 46 and re-entered to the storage container 24 and thus circulated for repeated utilization. The check valves 22, 32, 46 ensure the predetermined flow direction. The pressure control valve 40 together with the compressor control ensures that the pressure within the container does not fall below a predetermined level. For removal of the sufficiently cooled off hollow body from the open-end blow form, the cut-off valves which are located closely behind the blow mandrels 16 and 18 are briefly blocked and the blow form vented (depressurized). The loss in cooling medium which occurs thereby is being offset by the check valve 22 and the connector 20 from the one of the cooling medium reservoir.

In a further embodiment, the blow air which is brought into circulation is additionally dried in a dryer 52 and further cooled in at least one cooling aggregate 54 to a temperature from 0 C to −50 C, preferably to −30 C.

For this purpose, a parallel by-pass line (by-pass) is integrated into the arrangement in front of the check valve 32 by means of a switching valve 56. In this by-pass line, after the switching valve 58, the blow medium is dried in a dryer 52 (for example an adsorption dryer) up to suitably low dew point and further cooled in at least one further cooling aggregate 54. Via a further switching valve 60, the so dried and further cooled blow air is coupled into the closed circulation circuit.

In this embodiment, the hollow body to be produced is first pre-blown via the normal circulation with blow medium that has not been further cooled, (for example auxiliary air) and then blown; for the cooling phase, the valves 56 and 60 are being changed over and the blow medium which has been cooled to a lower temperature is guided via the parallel cooling distance into the closed circulation cycle and into the blown hollow body.

The special feature of the method according to the invention is characterized by the following new features and advantages:

The media which are utilized for cooling are exclusively cycled with only little loss of the respective pressure level; wherein the pressure level can be up to 20 bar depending upon the size of the hollow body. The cooling media also serve as heat exchanger and transport between the interior surface of the hollow body and a heat exchanger (heat release from the system). Thus, under operation, the compressor has to compensate for only the relatively small system losses occurring during pressure release upon discharge of the hollow body from the opened blow form as well as flow losses and expansion work within the media cycle. As a result, the system operates with a very large flow volume at high interior pressure level, without substantial use in operating material of cooling media.

All techniques known in the prior art still suffer from the same drawbacks namely that after the transition of heat energy from the interior of the container to the blow—respectively the cooling medium, the medium itself, especially when run at relatively high pressure level, is being released into the environment and thus is not available for the further operation and the further use in the cooling process.

Through the use of a guide screen or a flow guide plate at or in the nozzle, a rotational momentum is being introduced into the flow. This flow leads to an additional rotational flow and media turbulence in the hollow body. This likewise leads to an improvement of the heat transfer and heat discharge of the media in the hollow body from the interior surface of the hollow body though enforced convection. In addition, this effectively counteracts a possible formation of zones in which the flow of cooling medium is removed from the surface of the interior surface of the hollow body (dead water zone). This is particularly important since in these dead water zones almost no heat transfer takes place between the hollow body surface and the cooling medium.

Intensive cooling of the hollow body results from the very high flow speed, the low temperature and the additional rotational flow within the hollow body. From this, a substantial production efficiency in the blow mold method is realized by shortening the cooling times, respectively the cycle times and thus raising the product yield (piece/hour).

Especially with larger hollow bodies, through utilization of the cooling medium in circulation, a considerable cost savings is realized through the use of less energy and production materials. This is amplified when utilizing even further cooled blow air of 0 C to −50 C (preferably about −30 C). This further cooled blow air must be dried prior to operation in order to prevent condensation and ice formation resulting therefrom. This can for example be realized by means of an adsorption dryer. This drying process is however comparably high in cost relative to investment and use in energy. When cooling medium is utilized in a closed cycle, operating complexity for drying is lowered considerably in dependence on the ratio between the (lost) portions of aeration and flushing by up to 80% depending upon the predetermined parameters of the methods used.

The heat capacity of the cooling medium air is being raised by means of enrichment respectively partial or complete replacement through other gaseous or fluid media (e.g. carbon dioxide, nitrogen, propane, noble gases or other gases that exhibit a heat capacity higher than that of air) or other cooling means. Due to the very small loss, the closed cycling of the cooling medium according to the present invention is suitable in the foregoing case as well.

Figure 2:
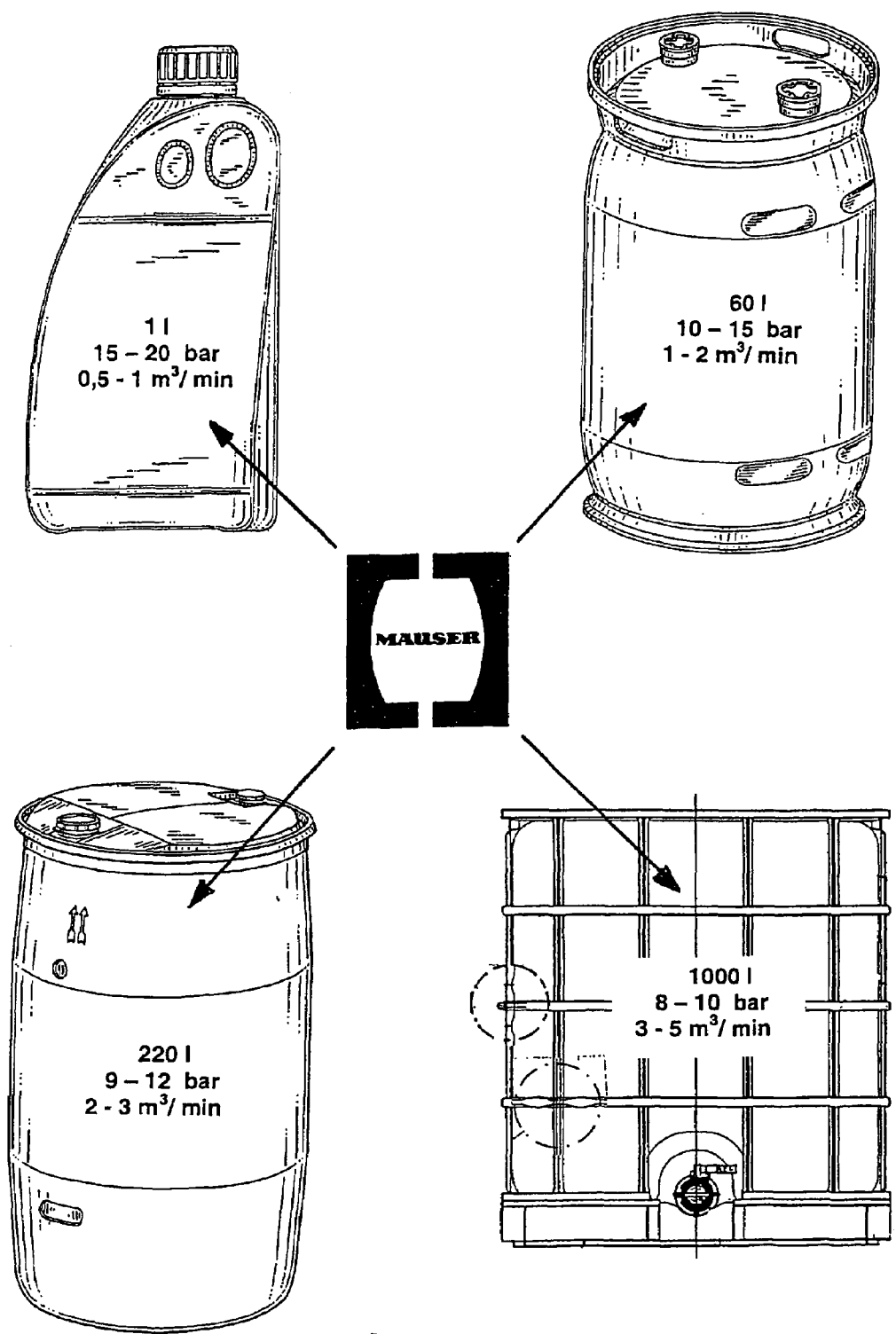
FIG. 2 is a schematic representation of the preferred blowing pressure and flow volume of blow/air cooling medium to be utilized for various sized plastic containers.

In the following table and as illustrated in FIG. 2, the preferred blowing pressure and flow volume of blow air/cooling medium to be utilized for various sized plastic containers is listed:

| PRODUCT | VOLUME | PRESSURE | FLOW VOL. |
| --- | --- | --- | --- |
| Box Hurrican | 1 l | 15-20 bar | 0.5-1 m$^3$/min |
| Canister | 30 l | 10-15 bar | 1-2 m$^3$/min |
| SVR fasset | 50 l | 10-15 bar | 1-2 m$^3$/min |
| Vanguard drum | 136 l | 9-12 bar | 2-3 m$^3$/min |
| L-ring drum | 220 l | 9-12 bar | 2-3 m$^3$/min |
| TC 1000 | 1000 l | 8-10 bar | 3-5 m$^3$/min |

The arrangement and the method of the invention can advantageously be retrofitted to existing blow molding machines in a simple manner. Thereby a higher yield in terms of piece per time unit can be realized from the blow molding machine at lower production costs.

The technical expenditure or the investment therefor are relatively low and amortization is realized normally in a short time through the respective higher efficiency of the installation.

What is claimed is:

1. An arrangement for producing blow formed hollow bodies from plastic with a blow molding machine, the blow molding machine comprising a closed conduit system for carrying compressed air as a cooling medium to be blown into a blow mold, respectively into the hollow body for blowing up and cooling of the blow-molded hollow body, wherein the blow mold, respectively the hollow body are integrated into a closed conduit system for circulating the compressed air and further comprising a dryer, which is integrated into the conduit system wherein a switching valve having a connector is provided at a blow air pressure container behind the dryer for supplying uncooled air.

2. The arrangement according to claim 1, further comprising at least one filter which is provided within the conduit system for cleaning the circulating compresses air.

3. The arrangement according to claim 1, further comprising a blow-in nozzle connected at an inlet side of the conduit system for blowing in the compressed air and further comprising an outlet nozzle at the outlet side for discharging the compressed air from the blow mold.

4. The arrangement according to claim 1, wherein the conduit system is further provided with a single blow mandrel for special types of hollow bodies having a single inlet and outlet, which mandrel is provided with an inlet line and a corresponding outlet line for the compressed air, and wherein the inlet line and the outlet line are disposed parallel or concentric within the blow mandrel.

5. The arrangement according to claim 3, wherein the conduit system is provided with a blocking valve at the inlet side in front of the blow nozzle and at the outlet side at least one of, behind the blow nozzle and in front of the inlet line and behind the outlet line for pressure release in the blow mold for discharging the blow-molded article form the blow mold.

6. The arrangement according to claim 5, wherein the nozzle of the blow mandrel is provided at the outlet side with at least one of a swirl body and a swirl guide plate.

7. The arrangement according to claim 3, wherein the conduit system is provided at the outlet side behind a blow nozzle with a pressure control valve for controlling an interior pressure in the hollow body.

8. The arrangement according to claim 7, wherein the conduit system is provided with at least one check valve for ensuring a predetermined circulation direction during operation.

9. The arrangement according to claim 1, wherein the conduit system is provided with a connector to a fresh air reservoir for replenishing any loss of compressed air from the conduit system.

10. The arrangement according to claim 1, wherein the dryer is an adsorption dryer.

11. The arrangement according to claim 1, wherein the dryer is provided with a check valve.

12. An arrangement for producing blow formed hollow bodies from plastic with a blow molding machine, the blow molding machine comprising a closed conduit system for carrying compressed air as a cooling medium to be blown into a blow mold, respectively into the hollow body for blowing up and cooling of the blow-molded hollow body, wherein the blow mold, respectively the hollow body are integrated into a closed conduit system for circulating the compressed air and further comprising a dryer, which is integrated into the conduit system, wherein a switching valve having a connector is provided at a blow air pressure container behind the dryer for supplying uncooled air, wherein the dryer and a cooling aggregate are disposed in a parallel bypass line, which is connected to the conduit system via two switching valves.

* * * * *